United States Patent
Vadivelu (10) Patent No.: US 8,537,715 B1
(45) Date of Patent: Sep. 17, 2013

(54) METHOD AND SYSTEM FOR NETWORK FAILOVER AND NETWORK SELECTION WITH MULTI-MODE MODEM IN REMOTE ACCESS POINTS

(71) Applicant: Jagachittes Vadivelu, Bangalore (IN)

(72) Inventor: Jagachittes Vadivelu, Bangalore (IN)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

(21) Appl. No.: 13/664,326

(22) Filed: Oct. 30, 2012

(51) Int. Cl.
*H04L 12/26* (2006.01)

(52) U.S. Cl.
USPC ......................................................... 370/252

(58) Field of Classification Search
USPC .................. 370/216–218, 221, 225, 229–231, 370/241, 252, 351, 389, 431, 463, 203–205, 370/212–213, 215; 455/422.1, 436–442, 455/39, 500, 509, 513, 517, 524–525, 62, 455/91, 115.1, 115.3, 130, 132–135, 226.1–226.3
See application file for complete search history.

(56) References Cited

U.S. PATENT DOCUMENTS

| | | | |
|---|---|---|---|
| 8,305,980 B1* | 11/2012 | Nix ................................ | 370/329 |
| 2006/0062208 A1* | 3/2006 | Li et al. .......................... | 370/352 |
| 2007/0053327 A1* | 3/2007 | Park .............................. | 370/335 |
| 2011/0286437 A1* | 11/2011 | Austin et al. ................... | 370/338 |
| 2012/0236739 A1* | 9/2012 | Wang ............................. | 370/252 |
| 2013/0034083 A1* | 2/2013 | Karaoguz et al. ............. | 370/331 |

* cited by examiner

*Primary Examiner* — Omar Ghowrwal
(74) *Attorney, Agent, or Firm* — Blakely, Sokoloff, Taylor & Zafman LLP (57) ABSTRACT

The present disclosure discloses a method and network device for network failover and/or network selection with a multi-mode modem in remote access points. A RAP initially is set to allow the modem's firmware to select an ISP-preferred available network. Then, the RAP collects network selection attributes, including RSSI, for the selected network, derives a NSC value based on the attributes, and determines whether the derived NSC value is within an expected range. If so, the device establishes a secure tunnel connection through the modem on the modem-selected network. Otherwise, the RAP commands the modem connect to an alternative network, and derives the NSC value for the alternative network selected by the RAP. If the NSC value for the alternative network is within an expected range, the RAP establishes a secure connection on the alternative network. On rebootstrap, the RAP repeats the above operations until a stable network is selected.

26 Claims, 5 Drawing Sheets

METHOD AND SYSTEM FOR NETWORK FAILOVER AND NETWORK SELECTION WITH MULTI-MODE MODEM IN REMOTE ACCESS POINTS

FIELD

The present disclosure relates to wireless network selection. In particular, the present disclosure relates to a system and method for network failover and network selection with multi-mode modem in remote access points.

BACKGROUND

Mobility in the corporate world is increasing at an incredible rate with users traveling around the globe and working partially or fully at home. The ability to move and remain fully connected is the paramount concern. The office connection needs to be pervasive and available no matter where the user is physically located. Productivity shall not be hindered simply because the user is not in the corporate office.

Remote Access Point (RAP) solutions involve configuring a thin access point to provide certain level of services to a remote client by tunneling securely back to the corporate network. The same Service Set Identifiers (SSIDs), encryption, and authentication requirements that exist on the corporate network are present on the RAP. The client device at a remote node or branch will automatically associate with the RAP as it would in the central node or corporate network, and allows for centralized management of a truly mobile edge. Thus, RAP is an extension of the corporate network in a similar fashion to a branch office with simplified configurations and integrated security.

A RAP can connect to a corporate network through a multi-mode modem that supports multiple types of networks, e.g., 2G networks, 3G networks, 4G networks, etc. Usually, the multi-mode modem is configured with a factory default setting indicating an Internet Service Provider (ISP) preferred network. If the multi-mode modem fails to establish a connection over the ISP-preferred network, it will select a secondary network. However, in some cases, the multi-mode modem is able to establish a connection on the ISP-preferred network. Nonetheless, the quality of connection over the ISP-preferred network between the RAP and the control device on the corporate network may not be good enough for establishing a secured tunnel, e.g., a Generic Routing Encapsulation (GRE) tunnel, for secure data transmission. As a result, remote users will fail in their attempt to connect to the corporate network due to the poor signal quality of the connection on the ISP-preferred network.

Hence, conventional RAP solutions cannot assure quick selection of a stable network with a multi-mode modem over which a secure data transmission tunnel can be successfully established with the corporate network. At best, a network administrator has to track all available networks at the location of RAP deployment. If the network administrator observes that the network signal coverage on the ISP-preferred network is not good enough, and assuming that an alternative network at the location has better coverage, the network administrator will need to manually provision or re-provision the RAP with the parameters corresponding to the alternative network, and reboot the RAP if needed, such that the clients at the remote node/branch can establish a secure communication path with the corporate network through the modem over the alternative network.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to channel scanning in discovery stage of fast roaming in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless network selection. In particular, the present disclosure relates to a system and method for network failover and network selection with multi-mode modem in remote access points.

According to embodiments of the present disclosure, the multi-mode modem is initially set in factory default mode (e.g., an automatic mode), allowing the modem firmware to select the available network. Then, for the selected network (e.g., a 4G network), collect primary and secondary network selection attributes, derive a network selection criteria (NSC) value, and determine whether the derived NSC value is within an expected range.

If the NSC value is within the expected range, the RAP will establish secure tunnel connection through the multi-mode modem on the modem-selected network. If, however, the NSC value is not within the expected range, then the RAP will set the multi-mode modem to an alternative network (e.g., 3G network). The RAP will then derive the NSC value for the alternative network, and determine whether the derived NSC value is within an expected range. If so, the RAP will establish secure tunnel connection through the multi-mode modem on alternative network. On subsequent rebootstrap events, the RAP will repeat the above operations until a stable network with good quality for secured tunnel connection to the corporate network is selected.

Computing Environment

Figure 1:
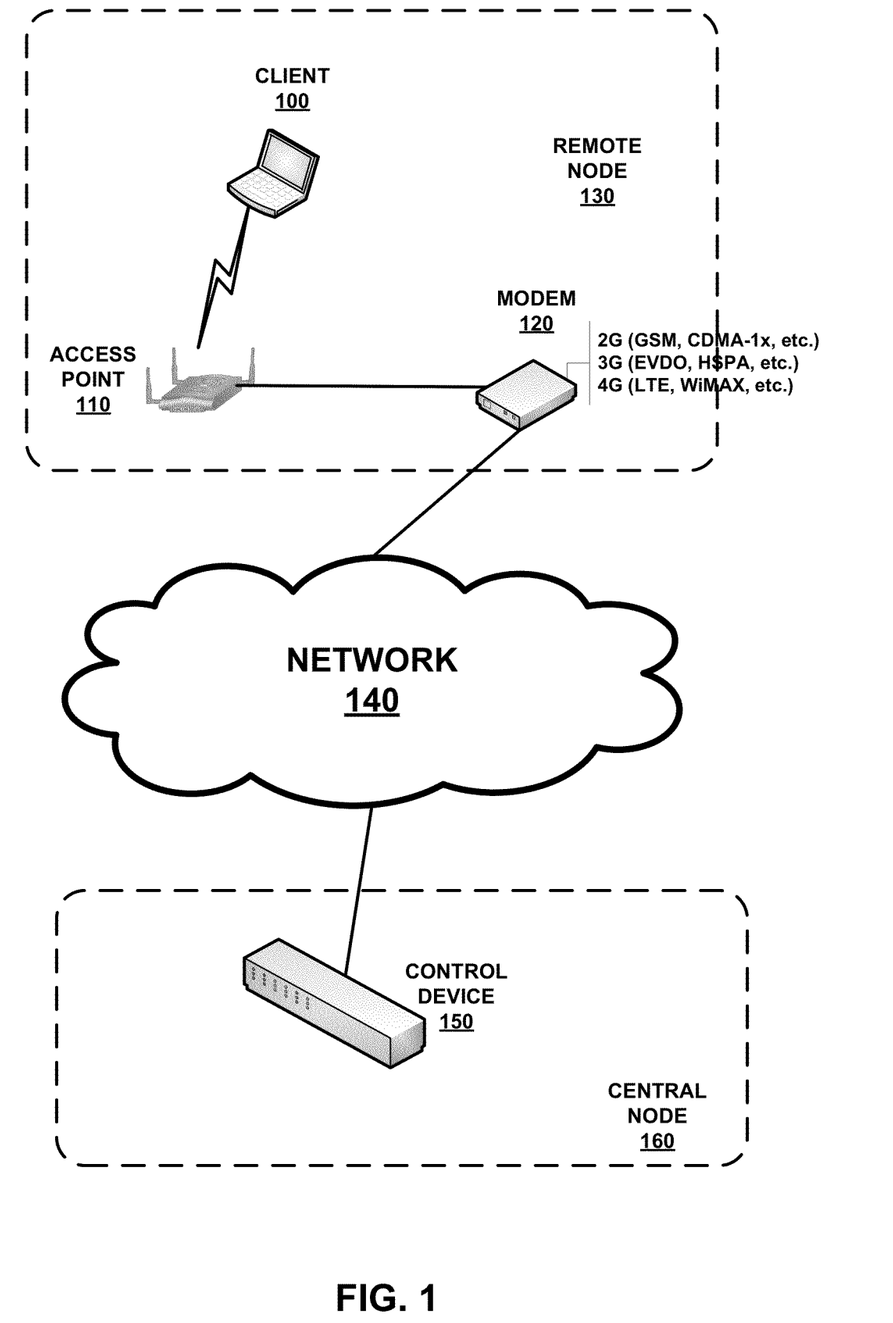
FIG. 1 is a diagram illustrating an exemplary wireless network environment according to embodiments of the present disclosure.

FIG. 1 shows an exemplary wireless digital network environment according to embodiments of the present disclosure. FIG. 1 includes a central node 160 and a remote node 130 that are interconnected via a network 140. Network 140 can be a wired network, a wireless network, and/or a hybrid or combination of both.

Central node 160 has a plurality of digital devices, including both network devices that provide network services and client devices that consume network services. The network devices include one or more control devices, e.g., control device 150.

In addition to optional data traffic forwarding, control device 150 handles a variety of traffic on the control plane, including Bridge Protocol Data Units (BPDUs), routing updates, Hot Standby Router Protocol (HSRP), process-switched packets, Address Resolution Protocol (ARP), and management traffic, such as Secure Shell (SSH), Simple Network Management Protocol (SNMP), Remote Authentication Dial In User Service (RADIUS), etc.

Moreover, control device 150 may be communicating with a plurality of other network devices, such as access points. Each network device, such as access point, can be communicatively coupled to zero or more client devices via one or more wired and/or wireless interfaces. Trusted communications among various digital devices at central node 160 are typically secured by a firewall or similar security policies and mechanisms.

Remote node 130, on the other hand, typically needs to establish a secure communication path, such as a Generic Routing Encapsulation (GRE) tunnel, for a digital device at the remote node to communicate to digital devices at central node 160. In some embodiments, the secure communication path can be established over a network connection through a network device at an Internet Service Provider (ISP), e.g. a modem device such as modem 120.

Modem 120 may support multiple modes and thus allow selections from multiple available types of networks when a access point, such as access point 110, attempts to establish a connection through modem 120. For example, networks supported by a multi-mode modem may include 2G networks (e.g., a Global System for Mobile Communications (GSM) network, a Code Division Multiple Access (CDMA) network, etc.), 3G networks (e.g., an Evolution-Data Optimized (EVDO) network, a High Speed Packet Access (HSPA), etc.), 4G networks (e.g., a Long Term Evolution (LTE) network, a Worldwide Interoperability for Microwave Access (WiMAX), etc.), and so on. After the access point (e.g., access point 110) establishes the connection tunnel through modem 120, all clients including client 100 can use the connection tunnel for traffic transmissions.

In some embodiments, an Internet Service Provider (ISP) providing the modem may pre-configure a preferred network, e.g., a 4G network, among all of the available networks that the modem supports. Thus, if the modem detects that a preferred network, e.g., a 4G network, is available, the firmware of the modem will select the preferred network (e.g., the 4G network) over other available networks (e.g., 2G or 3G networks) to connect to.

Moreover, remote access node 130 also includes a remote access point, e.g., access point 110. Access point 110 usually is a thin access point that provides services to a remote client through a secure communication path to the corporate network. The same Service Set Identifiers (SSIDs), encryption, and authentication requirements that exist on the corporate network may present on access point 110. The client device will automatically associate with the RAP as it would in the corporate network, and allows for centralized management of a truly mobile edge.

Furthermore, access point 110 at remote node 130 communicatively coupled with multi-mode modem 120 is generally capable of one or more of the followings—
Detecting the availability of access networks
Finding, receiving and processing measurements regarding the characteristics of available access networks
Accessing, modifying and storing the user profile
Allowing the user to dynamically redefine his/her preferences Central node 160 depicted in FIG. 1 may operate on a private network including one or more local area networks. The local area networks may be adapted to allow wireless access, thereby operating as a wireless local area network (WLAN). Moreover, the network may include a wired or wireless distribution system.

In addition, networks at central node 160 and/or remote node 130 may include multiple other network control plane devices, such as network controllers, switches, routers, etc., that transmits at least control plane traffic. Network control plane devices can provide functions, such as creating and enforcing network policies, providing adaptive radio management, intrusion prevention, quality of service, mobility, etc. Furthermore, networks at central node 160 and/or remote node 130 may also include a plurality of servers and/or client devices.

Network Failover and Network Selection

In a typical embodiment, when client 100 connects with access point 110 and requests connection to a corporate network at central node 160, access point 110 can establish a secure communication path through multi-mode modem 120, which supports multiple types of networks, e.g., 2G networks, 3G networks, 4G networks, etc. Modem 120 usually is configured with a factory default setting indicating an Internet Service Provider (ISP) preferred network, for example, a 4G network. If modem 120 fails to establish a connection over the ISP-preferred network (e.g., the 4G network), it will select a secondary network (e.g., a 3G network).

However, in some cases, modem 120 may be able to establish a non-secure connection on the ISP-preferred network (e.g., the 4G network). Nonetheless, the quality of the connection between access point 110 and control device 150 at central node 160 may not be good enough for establishing a secure communication path, e.g., an encapsulated tunnel such as a Generic Routing Encapsulation (GRE) tunnel, for secure data transmission between client 100 and digital devices at central node 160. Accordingly, client 100 will not be able to connect to the corporate network on the ISP-preferred network, although client 100 may access other Internet resources through modem 120 on the ISP-preferred network.

According to embodiments of the preset disclosure, access point 110 can determine a network selection or failover among multiple available networks supported by modem 120 based on a plurality of attributes, which help identifying a stable network. First, the method and/or system exploit the factory default mode, e.g., the ISP-preferred network selection according to modem 120's firmware settings.

Also, access point 110 will be set with a pre-determined bootstrap threshold time period, e.g., 30 seconds. The threshold time period can be configured and/or adjusted by a network administrator based on the deployment location of access point 110, the provider of modem 120, service requirements from client 100, etc. In some embodiments, the network administrator can configure multiple access points with the same threshold time period at the same time in a group. In some embodiments, the threshold time period value can be determined based shared network requirements and/or attributes.

If within the pre-determined bootstrap threshold time period, modem 120 fails to connect to the ISP-preferred network or cannot successfully maintain a stable connection with the ISP-preferred network, the firmware of modem 120 will usually use its built-in mechanism to select to connect to a secondary network.

If a connection, either to the ISP-preferred network or to a secondary network, has been established by modem 120, access point will start communication exchanges with control device 150 at central node 160. In some embodiments, control device 150 monitors connection attributes associated with the connection between remote node 130 and central node 160 via a series of heartbeats. The heartbeats are periodic message which helps in monitoring the health of the remote node's 130 uplink connectivity. If access point 110 fails to receive a signal, such as a heartbeat, from control device 150 at central node 160 within the pre-determined bootstrap threshold time period, the absence of heartbeat reception may indicate a connection issue with the uplink of access point 110. For example, the connection may be dropped due to poor connectivity.

Next, access point 110 will obtain a plurality of primary and secondary network selection attributes for the selected network by modem 120. The primary and secondary network selection attributes are related to criteria that are not typically used by multi-mode modem vendors, and thus not considered in the network selection or failover decision by the modem firmware. The primary and secondary network selection attributes will be described in details in sections below.

Furthermore, access point 110 derives a network selection criteria (NSC) value associated with the network selected by modem 120. Furthermore, access point 110 determines whether the NSC value for the network selected by modem 120, if any, is within an expected range. If so, access point 110 will connect to the network selected by modem 120.

If the NSC value of the network selected by modem 120 is not within the expected range, then access point 110 will communicate to modem 120 to set modem 120 to an alternative network that is different from the prior selected network by modem 120. After modem 120 selects the alternative network as communicated by access point 110, access point 110 derives the NSC value, and determines whether the NSC value for the network selection communicated by access point 110 is within an expected range. If so, access point 110 will connect to the alternative network communicated to modem 120 by access point 110.

In some embodiments, if an established connection between remote node 130 and central node 160 may not stable or may fail subsequently (e.g., when access point 110 is located on a moving object that moves from a 4G network coverage area into a 3G network coverage area), the subsequent poor connectivity after initial connection establishment may make it necessary for access point 110 to be re-provisioned and reboot. In those scenarios, on each subsequent rebootstrap event, access point 110 will repeat the operations described above. These operations allow access point 110 at remote node 130 to be able to select a stable network among available networks within a short duration and without changing modem 120's firmware network selection in scenarios where no change is needed.

Provisioning Parameters

According to embodiments of present disclosure, additional provisioning parameters will need to be configured on access point 110 to support for network selection or network failover by access point 110. The additional provisioning parameters include, but are not limited to, a 4G network type selection parameter (e.g., "4g_usb_type"), a 3G network type selection parameter (e.g., "usb_type"), etc.

The 4G network type selection parameter, such as "4g_usb_type" can be configured with any of a plurality of options, including but not limited to, beceem-wimax, 2. ether-lte, pantech-lte, etc. Moreover, the 3G network type selection parameter, such as "usb_type" can be configured with any of a plurality of options, including but not limited to, ether-3g, pantech-3g, etc.

In some embodiments, if only the 4G network type selection parameter is configured and the 3G network type selection parameter is not configured, access point 110 will connect on a 4G network only. Likewise, if only the 3G network type selection parameter is configured and the 4G network type selection parameter is not connected, access point 110 will connect on a 3G network only.

In some embodiments, when both the 4G network type selection parameter and the 3G network type selection parameter are configured on access point 110, access point 110 can be provisioned in both 4G and 3G mode, and thus allowing for automatic network selection between 3G network and 4G network.

In addition, additional command-line interface (CLI) commands will also be supported by access point 110. The additional CLI commands may include, but are not limited to, a command for providing modem 120's USB modem state, such as "show ap debug usb ap-name<ap-name>." The results of the command may indicate, but are not limited to, the following USB modem states: Active, Standby, Backup, Error, Not-plugged, etc. Moreover, the additional CLI command may also include, e.g., a command whose execution results indicate one or more available network services, a command whose execution results indicate the current network service, a command whose execution results indicate a version corresponding to firmware of modem 120, etc.

Primary and Secondary Network Selection Attributes

Figure 2:
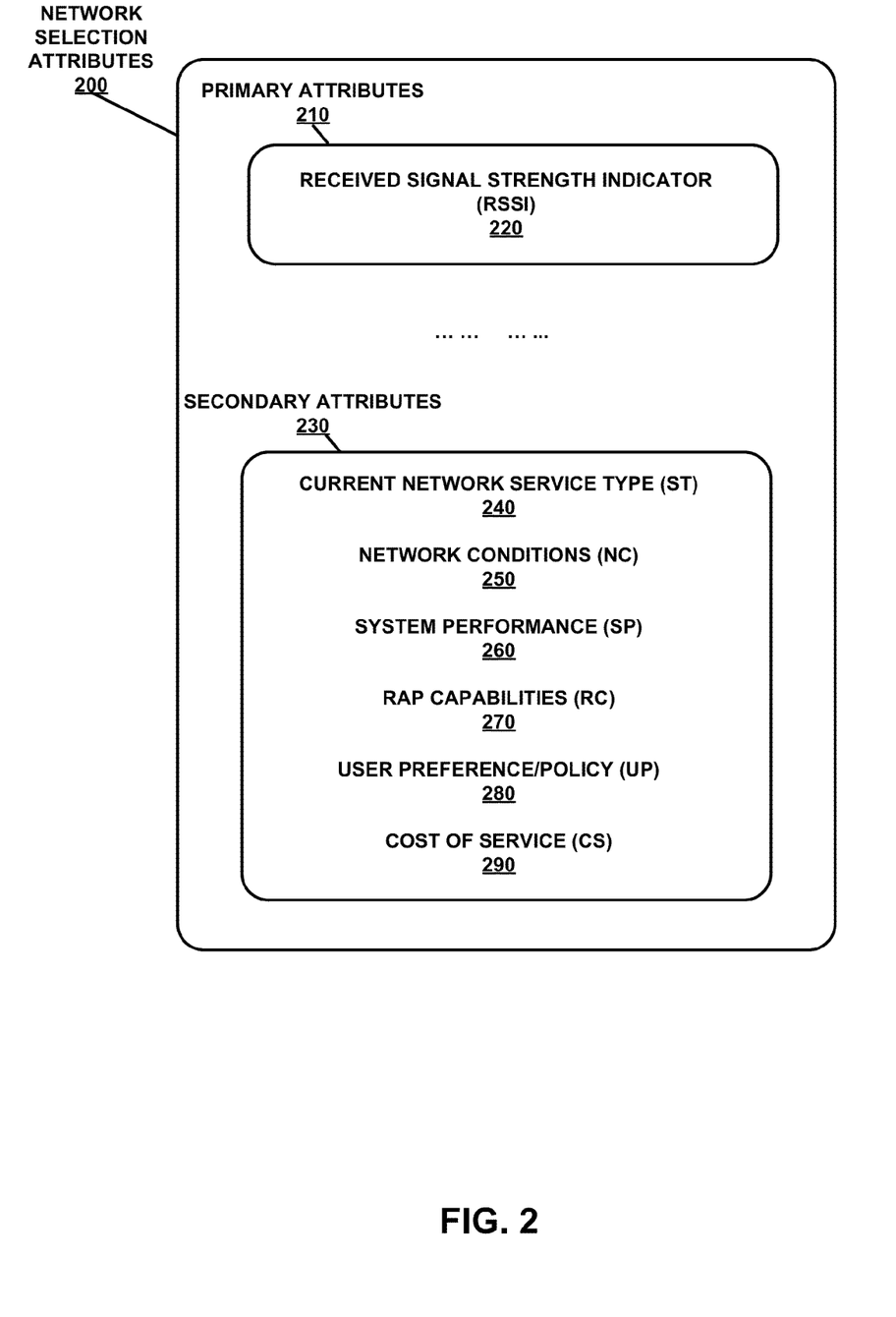
FIG. 2 is a block diagram illustrating exemplary network selection attributes according to embodiments of the present disclosure.

FIG. 2 is a block diagram illustrating exemplary network selection attributes. Network selection attributes 200 includes, but is not limited to, primary attributes 210 and secondary attributes 230. In some embodiments, primary network selection attributes 210 are mandatory attributes, whereas secondary network selection attributes 230 are optional attributes when calculating a network selection criteria (NSC) value. The non-mandatory flexibility of secondary network selection attributes 230 allow access points at a remote node to operate with zero-touch provisioning that does not need any external input from a user or a modem.

Primary attributes 210 includes, but is not limited to, received signal strength indicator (RSSI) 220. Based on the value of RSSI 220, the operating Signal Strength Level (SSL) can be classified into multiple grades, for example, "Grade I" (or "Great,") "Grade II" (or "Good,") "Grade III (or "Moderate,") and "Grade IV" (or "Poor.") Table 1 below shows an exemplary RSSI mapping and/or classification.

TABLE 1

| | Mapping | | | |
|---|---|---|---|---|
| Network | Grade I (1) | Grade II (0.9) | Grade III (0.85) | Grade IV (0.7) |
| GSM | <=89 | <=95 | <=103 | <=109 |
| CDMA-1x | <=75 | <=85 | <=95 | <=100 |
| EVDO | <=65 | <=75 | <=90 | <=105 |
| LTE | <=66 | <=72 | <=82 | <=86 |

In some embodiments, access point 110 at remote node 130 will connect to a particular type of wireless network only if the RSSI value detected on the particular network is higher than a required threshold value, e.g. a moderate signal strength level.

Furthermore, secondary network selection attributes 230 may include, but are not limited to, a current network service type (ST) 240, network conditions (NC) 250, system performance (SP) 260, remote access point capabilities (RC) 270, user preference/policy (UP) 280, cost of service (CS) 290, etc.

According to embodiments of the present disclosure, access point at the remote node may derive a network selection criteria (NSC) value by giving primary attributes 210 and secondary attributes 230 various weights. In some embodiments, primary attributes 210 are given more weights than secondary attributes 230. A remote user may alter the weights assigned to various network selection attributes 200 based on user requirements.

The exemplary formula given below describes one way of deriving network selection criteria (NSC) value.

$$NSC=w(pa)*RSSI+w(sa)/n*ST+w(sa)/n*NC+w(sa)/n*SP+w(sa)/n*RC+w(sa)/n*UP+w(sa)/n*CS$$

where:
  ST refers to current network service type, which includes, for example, 4G network service type (e.g., LTE, WiMAX, etc.), 3G network service type (e.g., EVDO, HSPA, etc.), 2G network service type (e.g., GSM, CDMA-1x, etc.);
  NC refers to network conditions that includes, for example, data rate, network access delay, a predefined quality of service (QoS) parameter associated with each network mode;
  SP refers to system performance that includes, but is not limited to, dynamic varying parameter, such as path loss, Bit Error Rate (BER), round-trip time (RTT), etc.
  RC refers to remote access point capabilities, which indicate a RAP's capability to control the particular multi-mode modem associated with the RAP;
  UP refers to user preferences/policy, which indicates a remote user's preference on the network service;
  CS refers to cost of service, which indicates, for example, traffic plan cost;
  w(pa) indicates a weight assigned to primary attributes 210, e.g., RSSI 220;
  w(sa) indicates a weight assigned to secondary attributes 230, e.g., Current Network Service Type (ST) 240, Network Conditions (NC) 250, System Performance (SP) 260, RAP Capabilities (RC) 270, User preferences/policy (UP) 280, Cost of Service (CS) 290, etc.;
  n is number of active secondary attributes 230, because it is possible that not all secondary attributes 230 are applicable under certain scenarios.

Note that, typically w(pa) is greater than w(sa). For example, a network administrator may assign 60% to w(pa) and 40% to w(sa). After the Network Selection Criteria (NSC) value is calculated by applying the above formula, the NSC value will be compared to a required or expected threshold limit. The RAP will select a nominal network mode only if the NSC value is above the required/expected threshold limit.

Table 2 below shows an exemplary ST mapping and/or classification.

TABLE 2

| | Mapping | | | |
|---|---|---|---|---|
| | 1 | 0.9 | 0.5 | 0 |
| Service Type (ST) | 4G | 3G | 2G | Not specified |

In some embodiments, secondary attributes, such as, Network Conditions (NC), System Performance (SP), RAP Capabilities (RC), User preferences/policy (UP) and Cost of Service (CS) are controlled by an external entity whether derived or provisioned. Therefore, by default, such parameters are set to 0/null, or its equivalent.

In an example, for illustration purposes only, consider that a RAP is deployed with a multi-mode modem (e.g., UML290) with default setting on good RSSI LTE coverage and no additional user preference provisioned, Also, the example assumes that primary attributes are given 60% of weight and secondary attributes are given 40% of weights. Hence, the NSC value for this RAP deployment will be calculated as 0.6*0.9+1*0.4=0.94.

Communication with Firmware by Remote Access Points

Multi-mode modems using different versions of firmware may require access points to communicate with the modems differently. For example, when a RAP is provisioned with only 4G network selection parameter, e.g., setting "4g_usb_type" as "pantech-lte," then the modem will be locked in LTE-only mode, and thus the RAP will try to connect to 4G-LTE network only. As another example, if the RAP is provisioned with other 3G network selection parameter, e.g., setting "usb_type" as "pantech-3g," and if the 4G network selection parameter is not provisioned, e.g., setting "4g_usb_type" to "none," then the modem will be locked in the 3G-only mode (either in CDMAX1 or EVDO). As a result, the RAP will try to connect to 3G-CDMA network even when 4G network is available.

Table 3 below shows an exemplary RAP provisioning for 3G-4G network selection/failover support for one type of multi-mode modem (e.g., Verizon 4G LTE UML-290). In Table 3, it is assumed that the multi-mode modem uses a firmware version of "L0290VWB522F.242" or above, and supports at least a USB interface and a QMA interface that allows dynamic communications of network selection commands from the remote access point.

TABLE 3

| 4G network selection parameter | 3G network selection parameter | Mode of operation | RAP deployment scenarios |
|---|---|---|---|
| pantech-lte (3) | none (0) | Only in 4G mode | (1) areas have only 4G network signal coverage; (2) user prefers only 4G network. |
| none (0) | pantech-3g (8) | Only in 3G mode | (1) areas have only 3G network signal coverage; (2) user prefers only 3G network. |
| pantech-lte (3) | pantech-3g (8) | Work in both 4G and 3G mode as per dynamically determined network coverage. | (1) mobile deployments (e.g., on a moving object such as a train or a bus); (2) no user preference among available networks, such as between 4G and 3G networks. |

In some embodiments where different types of multi-mode modem is used, when a RAP is provisioned with only 4G network selection parameter, e.g., setting "4g_usb_type" as "ether-lte," then the modem will be locked in LTE-only mode, and thus the RAP will try to connect to 4G-LTE network only. As another example, if the RAP is provisioned with other 3G network selection parameter, e.g., setting "usb_type" as "ether-3g," and if the 4G network selection parameter is not provisioned, e.g., setting "4g_usb_type" to "none," then the modem will be locked in the 3G-only mode (either in CDMAX1 or EVDO). As a result, the RAP will try to connect to 3G-CDMA network even when 4G network is available. If, however, the RAP is provisioned with both 4G and 3G network selection parameters, then the modem will be put in 4G (LTE-only) mode initially. Subsequently, if the 4G network coverage is not available, then the RAP will try to select a network based on derived NSC value, which is calculated based on one or more network selection parameters including RSSI, if firmware fails to select a stable network within a pre-determined threshold time period.

Table 4 below shows an exemplary RAP provisioning for 3G-4G network selection/failover support for another type of multi-mode modem (e.g., MC551L). In Table 3, it is assumed that the multi-mode modem uses a firmware version of "1.23.01 SVN 0" or above, and supports at least a USB interface and a QMA interface that allows dynamic communications of network selection commands from the remote access point.

| 4G network selection parameter | 3G network selection parameter | Usb_dev | Mode of operation | RAP deployment scenarios |
|---|---|---|---|---|
| ether-lte (2) | none (0) | 0x1410b001 | Only in 4G mode | (1) areas have only 4G network signal coverage; (2) user prefers only 4G network. |
| none (0) | ether-3g (9) | 0x1410b001 | Only in 3G mode | (1) areas have only 3G network signal coverage; (2) user prefers only 3G network. |
| ether-lte (2) | ether-3g (9) | 0x1410b001 | Work in both 4G and 3G mode as per dynamically determined network coverage. | (1) mobile deployments (e.g., on a moving object such as a train or a bus); (2) no user preference among available networks, such as between 4G and 3G networks. |

The following use case scenario demonstrates an exemplary usage of embodiments disclosed herein for illustration purposes only. A large variety of commands and settings can be used in the alternative without departing from the spirit of the invention. In the exemplary use case scenario, first, the control device at the central node can provision 4G network selection parameters, e.g., by setting "4g_usb_type" value as "lte-pantech,", "usb_type" value as "pantech-3g" and set celluar link priority to be higher than ehternet link priority. This provisioning infers that 3G/4G network will be given higher preference compared to Ethernet. With the above setting, the RAP will try connecting through its USB link first based on the NSC value derived as disclosed above. If the RAP fails to connect to any cellular network (e.g., 3G network or 4G network) within a specific amount of time, the RAP fails-over to Ethernet. If, on the other hand, the provisioned RAP successfully connects to a 4G network or 3G network, the control device at the central node will subsequently show the result of CLI command "show ap database" as Remote AP (R) and Cellular (C). In addition, execution results of commands such as "show ap database usb" will show information including, but not limited to, RSSI value, network service currently being used, etc.

Figure 3A:
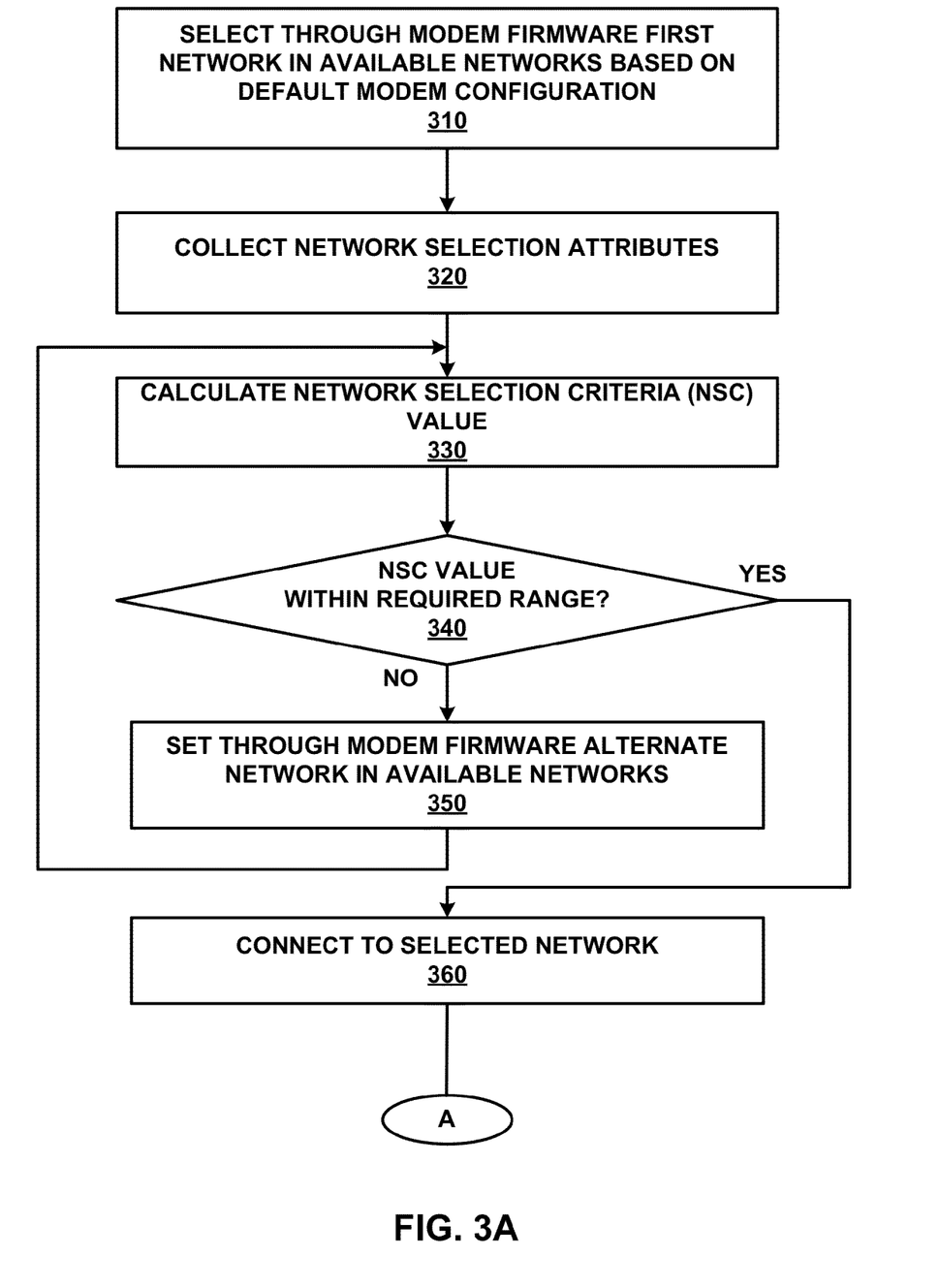
FIGS. 3A-3B are flowcharts illustrating exemplary method for network failover and network selection with multi-mode modem in remote access points according to embodiments of the present disclosure.
Figure 3B:
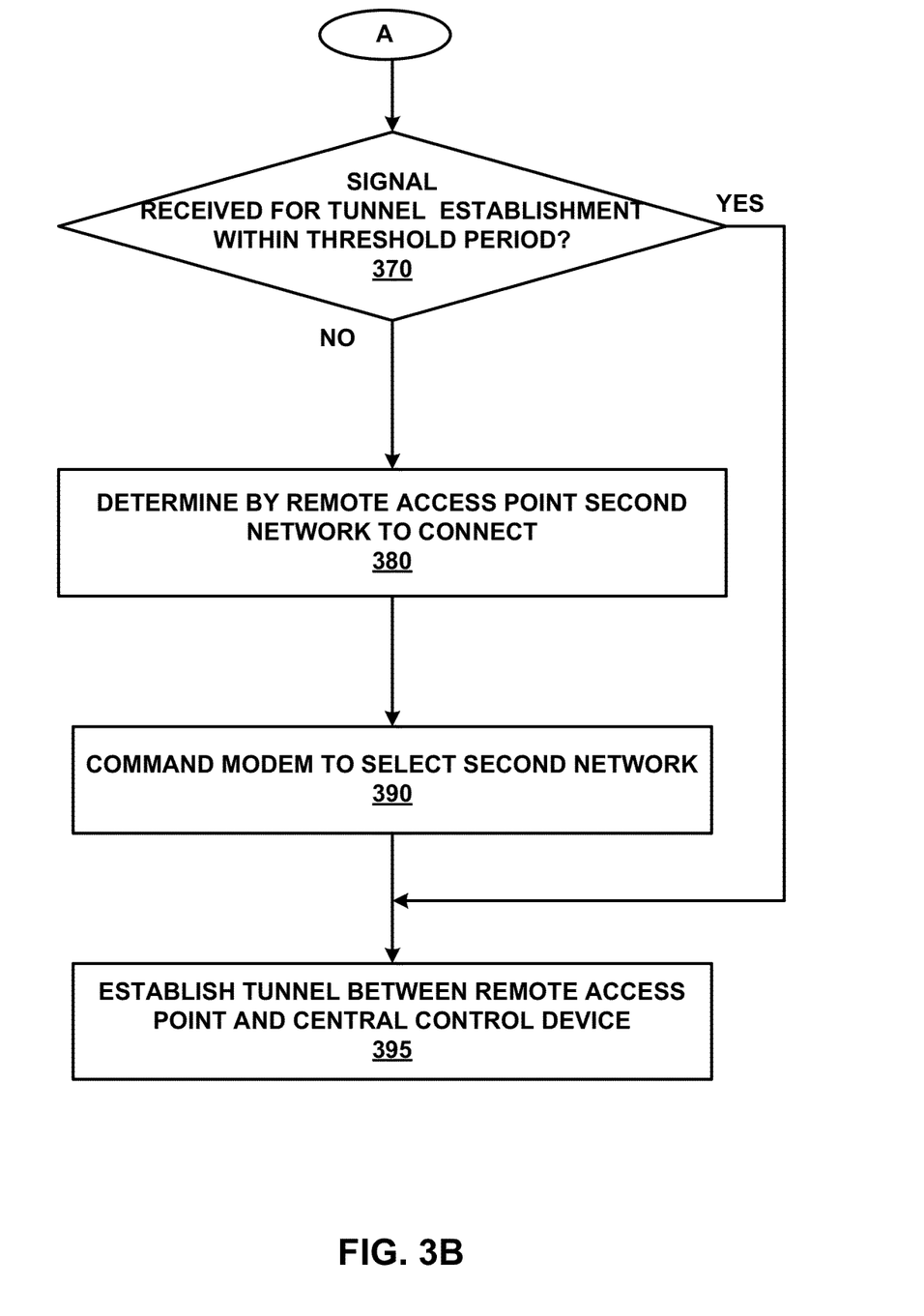

Processes for Network Failover and Network Selection with Multi-Mode Modem in Remote Access Points FIGS. 3A-3B are flowcharts illustrating exemplary process for network failover and network selection with multi-mode modem in remote access points according to embodiments of the present disclosure.

During operations, the disclosed system initially selects through multi-mode modem firmware a first network among available networks based on the default modem configuration (operation 310). Next, the disclosed system collects network selection attributes, including both primary attributes and optionally secondary attributes (operation 320).

The disclosed system then calculates a network selection criteria (NSC) value (operation 330), and determines whether the NSC value is within a required/expected range associated with the first network (operation 340). If so, the system connects to the selected network (operation 360). If not, the system set through the modem's firmware an alternate network in available networks (operation 350), and repeats the calculating and determining operations (operations 330-340).

Furthermore, the disclosed system can determine whether a signal associated with secure communication path (e.g., a GRE tunnel) establishment is received from a central network node within a pre-determined period of time (operation 370). If so, the disclosed system proceeds to establish a secure communication path (e.g., a GRE tunnel) between a remote access point at the remote node and a control device at the central node (operation 395). If, however, no signal is received from the central node within the pre-determined period of time, the disclosed device will determine a secondary network to connect to (operation 380). The selection of the secondary network can be performed by a remote access point based on a NSC value derived from a plurality of network selection parameters, including both primary attributes and optionally secondary attributes, as described above.

Next, the disclosed system will command the multi-mode modem to select the secondary network (operation 390). After the secondary network is selected by the multi-mode modem, the disclosed system may establish a secure communication path (e.g., a GRE tunnel) between a remote access point at the remote node and a control device at the central node (operation 395). Thereafter, the system may repeat operations 320-370 until a stable network connection has established (not shown).

Figure 4:
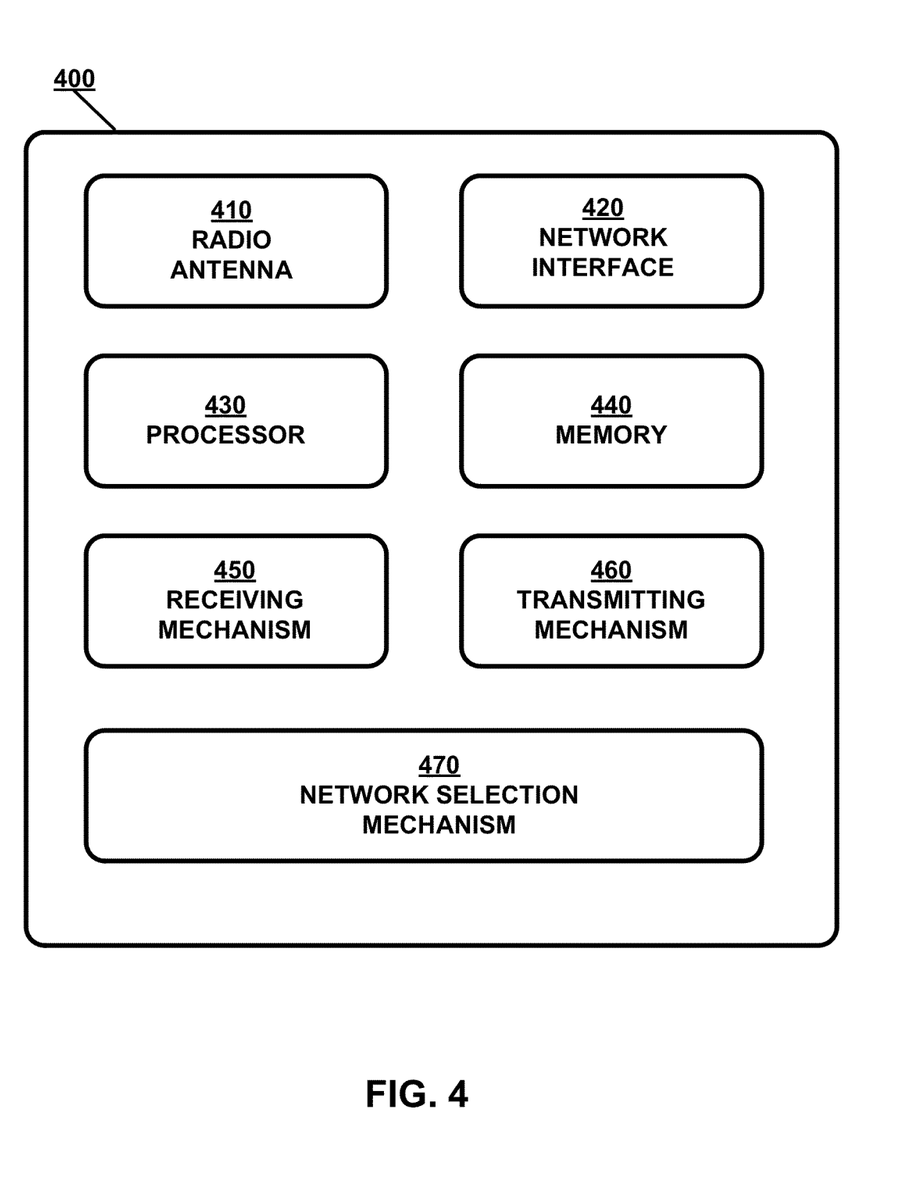
FIG. 4 is a block diagram illustrating exemplary system for network failover and network selection with multi-mode modem in remote access points according to embodiments of the present disclosure.

Systems for Network Failover and Network Selection with Multi-Mode Modem in Remote Access Points FIG. 4 is a block diagram illustrating exemplary system for network failover and network selection with multi-mode modem in remote access points according to embodiments of the present disclosure.

Network device 400 includes at least one or more radio antennas 410 capable of either transmitting or receiving radio signals or both, a network interface 420 capable of communicating to a wired or wireless network, a processor 430 capable of processing computing instructions, and a memory 440 capable of storing instructions and data. Moreover, network device 400 further includes a receiving mechanism 450, a transmitting mechanism 460, and a network selection mechanism 470, all of which are coupled to processor 430 and memory 440 in network device 400. Network device 400 may be used as a client system, or a server system, or may serve as node in a distributed or a cloud computing environment.

Radio antenna 410 may be any combination of known or conventional electrical components for receipt of signaling, including but not limited to, transistors, capacitors, resistors, multiplexers, wiring, registers, diodes or any other electrical components known or later become known.

Network interface 420 can be any communication interface, which includes but is not limited to, a modem, token ring interface, Ethernet interface, wireless IEEE 802.11 interface (e.g., IEEE 802.11n, IEEE 802.11ac, etc), cellular wireless interface, satellite transmission interface, or any other interface for coupling network devices. In some embodiments, network interface 420 may be software-defined and programmable, for example, via an Application Programming Interface (API), and thus allowing for remote control of the network device 400.

Processor 430 can include one or more microprocessors and/or network processors. Memory 440 can include storage components, such as, Dynamic Random Access Memory (DRAM), Static Random Access Memory (SRAM), etc.

Receiving mechanism 450 generally receives one or more network messages via network interface 420 from a network or a client, or radio antenna 810 from a wireless client over a wireless communication channel. The received network messages may include, but are not limited to, requests and/or responses, beacon frames, management frames, control path frames, and so on. Each message may comprise one or more data packets, for example, in the form of IP packets.

Transmitting mechanism 460 generally transmits messages, which include, but are not limited to, requests and/or responses, beacon frames, management frames, control path frames, and so on.

Network selection mechanism 470 generally selects one of a plurality of available networks supported by a multi-mode modem associated with network device 800.

Specifically, network selection mechanism 470 connects from network device 400 to a first network selected by a multi-mode modem that supports a plurality of networks. Also, network selection mechanism 470 derives a network selection criterion value which is based at least in part on a received signal strength level of a signal received on the first network. If the derived network selection criterion value corresponding to the first network is not within an expected range, network selection mechanism 470 commands the multi-mode modem to select a second network from the plurality of networks. If, on the other hand, the derived network selection criterion value corresponding to the first network is within the expected range, the network selection mechanism establishes a secure communication path through the multi-mode modem to a central corporate network. In one embodiment, the secure communication path includes a Generic Routing Encapsulation (GRE) tunnel.

Note that, in some embodiments, the first network is determined by a firmware associated with the multi-mode modem, and the second network is determined by the network device. Furthermore, in some embodiments, the network selection criterion value corresponding to the first network not being within the expected range indicates that the network device is unlikely to establish the secure communication path to the central network through the multi-mode modem.

In some embodiments, network selection mechanism 470 further initiates a timer with a predefined time period. If the network selection criterion value corresponding to the first network is not within the expected range and the timer expires, network selection mechanism 470 further connects to an alternative network selected by the multi-mode modem. Note that, in these embodiments, network selection mechanism 470 commands the multi-mode modem to select the second network if the network selection criterion value corresponding to the alternative network selected by the multi-mode modem is not within the expected range.

In some embodiments, network selection mechanism 470 further collects a plurality of network selection attributes, including but not limited to, one or more of the following: a current network service type; a network condition; a system performance measure; a remote access point capability; a user preference; a user policy; a cost of service; etc. Furthermore, the network selection criterion value may be determined based on a weighted average value of the collected plurality of network selection attributes above.

Specifically, the current network service type includes, but is not limited to, one or more of: a 4G network comprising one or more of a Long Term Evolution (LTE) network, a Worldwide Interoperability for Microwave Access (WiMAX) network; a 3G network comprising one or more of an Evolution-Data Optimized (EVDO) network, a High Speed Packet Access (HSPA) network; a 2G network comprising one or more of a Global System for Mobile Communications (GSM) network, a Code Division Multiple Access (CDMA) network; etc.

Moreover, the network condition includes, but is not limited to, one or more of: a data transmission rate; an amount of network access delay; a pre-defined Quality of Service (QoS) parameter associated with each network service type; etc.

Also, the system performance includes, but is not limited to, one or more of: a path loss parameter; a Bit Error Rate (BER); a round-trip time (RTT); etc. The remote access point capability generally indicates at least the network device's capability to control the multi-mode modem. The user preference generally indicates at least a remote user's preference on the network service. The user policy generally indicates a network administration policy applicable to the remote user. And, the cost of service generally includes a traffic plan cost amount.

Therefore, receiving mechanism 450, transmitting mechanism 460, and network selection mechanism 470 often collectively operate with each other to provide support for network failover and/or network selection with multi-mode modem in remote access points.

According to embodiments of the present disclosure, network services provided by wireless network device 400, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
    connecting, by a network device, to a first network selected by a multi-mode modem that supports a plurality of networks;
    deriving, by the network device, a network selection criterion value based on a summation of (i) a received signal strength level of a signal received on the first network weighted by a first weight assigned to a primary attribute, and (ii) a set of secondary attributes weighted by a second weight assigned to the set of secondary attributes, the set of secondary attributes comprising a current network service type, a network condition, a system performance measure, a remote access point capability, a user preference, a user policy, and a cost of service; and
    in response to the network selection criterion value corresponding to the first network being outside an expected range, commanding, by the network device, the multi-mode modem to select a second network from the plurality of networks.

2. The method of claim 1, wherein the first network is determined by a firmware associated with the multi-mode modem, and wherein the second network is determined by the network device.

3. The method of claim 1, further comprising:
    in response to the network selection criterion value corresponding to the first network being within the expected range, establishing, by the network device, a secure communication path through the multi-mode modem to a central network.

4. The method of claim 3, wherein the secure communication path comprises a Generic Routing Encapsulation (GRE) tunnel.

5. The method of claim 3, wherein the network selection criterion value corresponding to the first network being outside the expected range indicates that the network device is unlikely to establish the secure communication path to the central network through the multi-mode modem.

6. The method of claim 1, further comprising:
initiating, by the network device, a timer with a predefined time period;
prior to the timer expiring and in response to the network selection criterion value corresponding to the first network not being within the expected range, connecting, by the network device, to an alternative network selected by the multi-mode modem, and
wherein commanding the multi-mode modem to select the second network is further in response to the network selection criterion value corresponding to the alternative network selected by the multi-mode modem being outside the expected range.

7. The method of claim 1, further comprising:
collecting a plurality of network selection attributes including:
the current network received signal strength;
the current network service type;
the network condition;
the system performance measure;
the remote access point capability;
the user preference;
the user policy; and
the cost of service.

8. The method of claim 7, wherein an equal fraction of the second weight is assigned to each secondary attribute in the set of secondary attributes.

9. The method of claim 7, wherein the current network service type includes one or more of:
a 4G network comprising one or more of a Long Term Evolution (LTE) network, a Worldwide Interoperability for Microwave Access (WiMAX) network;
a 3G network comprising one or more of an Evolution-Data Optimized (EVDO) network, a High Speed Packet Access (HSPA) network; and
a 2G network comprising one or more of a Global System for Mobile Communications (GSM) network, a Code Division Multiple Access (CDMA) network.

10. The method of claim 7, wherein the network condition comprises one or more of:
a data transmission rate;
an amount of network access delay; and
a pre-defined Quality of Service (QoS) parameter associated with each network service type.

11. The method of claim 7, wherein the system performance comprises one or more of:
a path loss parameter;
a Bit Error Rate (BER); and
a round-trip time (RTT).

12. The method of claim 7, wherein the remote access point capability indicates at least a capability of the network device to control the multi-mode modem.

13. The method of claim 7, wherein the user preference and the user policy indicate at least a preference of a remote user on the network service, and a network administration policy applicable to the remote user.

14. The method of claim 7, wherein the cost of service comprises a traffic plan cost amount.

15. A network device comprising:
a processor;
a memory; and
a network selection mechanism operating with the processor, the network selection mechanism to:
connect from the network device to a first network selected by a multi-mode modem that supports a plurality of networks;
derive a network selection criterion value which is based on a summation of (i) a received signal strength level of a signal received on the first network weighted by a first weight assigned to a primary attribute, and (ii) a set of secondary attributes weighted by a second weight assigned to the set of secondary attributes, the set of secondary attributes comprising a current network service type, a network condition, a system performance measure, a remote access point capability, a user preference, a user policy, and a cost of service; and
command the multi-mode modem to select a second network from the plurality of networks in response to the network selection criterion value corresponding to the first network being outside an expected range.

16. The network device of claim 15, wherein the first network is determined by a firmware associated with the multi-mode modem, and wherein the second network is determined by the network device.

17. The network device of claim 15, wherein the network selection mechanism further to establish a secure communication path through the multi-mode modem to a central network in response to the network selection criterion value corresponding to the first network being within the expected range.

18. The network device of claim 17, wherein the secure communication path comprises a Generic Routing Encapsulation (GRE) tunnel.

19. The network device of claim 17, wherein the network selection criterion value corresponding to the first network being outside the expected range indicates that the network device is unlikely to establish the secure communication path to the central network through the multi-mode modem.

20. The network device of claim 15, wherein the network selection mechanism further to:
initiate a timer with a predefined time period; and
connect to an alternative network selected by the multi-mode modem prior to the timer expiring and in response to the network selection criterion value corresponding to the first network not being within the expected range,
wherein commanding the multi-mode modem to select the second network is further in response to the network selection criterion value corresponding to the alternative network selected by the multi-mode modem not being within the expected range.

21. The network device of claim 15, wherein the network selection mechanism further to collect a plurality of network selection attributes including:
the current network received signal strength;
the current network service type;
the network condition;
the system performance measure;
the remote access point capability;
the user preference;
the user policy; and
the cost of service.

22. The network device of claim 21, wherein the current network service type includes one or more of:
a 4G network comprising one or more of a Long Term Evolution (LTE) network, a Worldwide Interoperability for Microwave Access (WiMAX) network;
a 3G network comprising one or more of an Evolution-Data Optimized (EVDO) network, a High Speed Packet Access (HSPA) network; and
a 2G network comprising one or more of a Global System for Mobile Communications (GSM) network, a Code Division Multiple Access (CDMA) network.

23. The network device of claim 21, wherein the network condition comprises one or more of:
- a data transmission rate;
- an amount of network access delay; and
- a pre-defined Quality of Service (QoS) parameter associated with each network service type.

24. The network device of claim 21, wherein the system performance comprises one or more of:
- a path loss parameter;
- a Bit Error Rate (BER); and
- a round-trip time (RTT).

25. The network device of claim 21, wherein one or more of following statements apply:
- the remote access point capability indicates at least a capability of the network device to control the multi-mode modem;
- the user preference indicates at least a remote user's preference on the network service;
- the user policy indicates a network administration policy applicable to the remote user; and
- the cost of service comprises a traffic plan cost amount.

26. A non-transitory computer-readable storage medium storing embedded instructions that are executed by one or more mechanisms implemented within a network device to perform a plurality of operations comprising:
- connecting to a first network selected by a multi-mode modem that supports a plurality of networks;
- deriving a network selection criterion value based on a summation of (i) a received signal strength level of a signal received on the first network weighted by a first weight assigned to a primary attribute, and (ii) a set of secondary attributes weighted by a second weight assigned to the set of secondary attributes, the set of secondary attributes comprising a current network service type, a network condition, a system performance measure, a remote access point capability, a user preference, a user policy, and a cost of service;
- in response to the network selection criterion value corresponding to the first network being outside an expected range, commanding the multi-mode modem to select a second network from the plurality of networks; and
- in response to the network selection criterion value corresponding to the first network being within the expected range, establishing a secure communication path through the multi-mode modem to a central network.

* * * * *